United States Patent
Hyeon

(10) Patent No.: US 7,617,594 B2
(45) Date of Patent: Nov. 17, 2009

(54) APPARATUS FOR FIXING A STATOR OF A MOTOR OF A RECIPROCAL COMPRESSOR

(75) Inventor: Seong-Yeol Hyeon, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/572,955

(22) PCT Filed: Sep. 2, 2004

(86) PCT No.: PCT/KR2004/002225

§ 371 (c)(1),
(2), (4) Date: Apr. 15, 2008

(87) PCT Pub. No.: WO2005/028867

PCT Pub. Date: Mar. 31, 2005

(65) Prior Publication Data

US 2008/0189935 A1 Aug. 14, 2008

(30) Foreign Application Priority Data

Sep. 22, 2003 (KR) ...................... 10-2003-0065658

(51) Int. Cl.
*H02K 15/02* (2006.01)

(52) U.S. Cl. .............................. 29/732; 29/729; 29/596; 29/33 K; 417/417

(58) Field of Classification Search ........... 29/732–736, 29/596–598, 33 K; 417/360, 417; 310/12, 310/15

See application file for complete search history.

(56) References Cited

U.S. PATENT DOCUMENTS

| | | | | |
|---|---|---|---|---|
| 6,089,836 A | * | 7/2000 | Seo | .............................. 417/417 |
| 6,202,791 B1 | * | 3/2001 | Oh et al. | ...................... 184/6.16 |
| 6,339,876 B1 | | 1/2002 | Lee | ........................... 29/888.02 |
| 6,881,042 B2 | * | 4/2005 | Heo et al. | ..................... 417/417 |
| 7,306,438 B2 | * | 12/2007 | Kang et al. | ................... 417/417 |
| 2003/0175135 A1 | | 9/2003 | Heo et al. | .................... 417/363 |
| 2008/0189935 A1 | * | 8/2008 | Hyeon | .......................... 29/732 |

FOREIGN PATENT DOCUMENTS

| | | |
|---|---|---|
| GB | 2042813 | 9/1980 |
| WO | WO00/70223 | 11/2000 |
| WO | WO 01/88383 | 11/2001 |
| WO | WO 02/095232 | 11/2002 |

* cited by examiner

*Primary Examiner*—Minh Trinh
(74) *Attorney, Agent, or Firm*—Ked & Associates LLP

(57) ABSTRACT

An apparatus that fixes a stator of a motor of a reciprocal compressor is provided. The apparatus includes a front frame, a cylinder inserted into and coupled to the front frame, an outer stator supported by and contacting the front frame, an inner stator formed in a cylindrical shape and inserted onto an outside circumferential surface of the cylinder with a predetermined interval from an inside diameter of the outer stator, a mover inserted between the outer stator and the inner stator and coupled to a piston inserted into the cylinder, and a stator fixing device incorporated with the front frame to pass through the cylinder or the inner stator in a longitudinal direction that supports and fixes both sides of the inner stator.

12 Claims, 6 Drawing Sheets

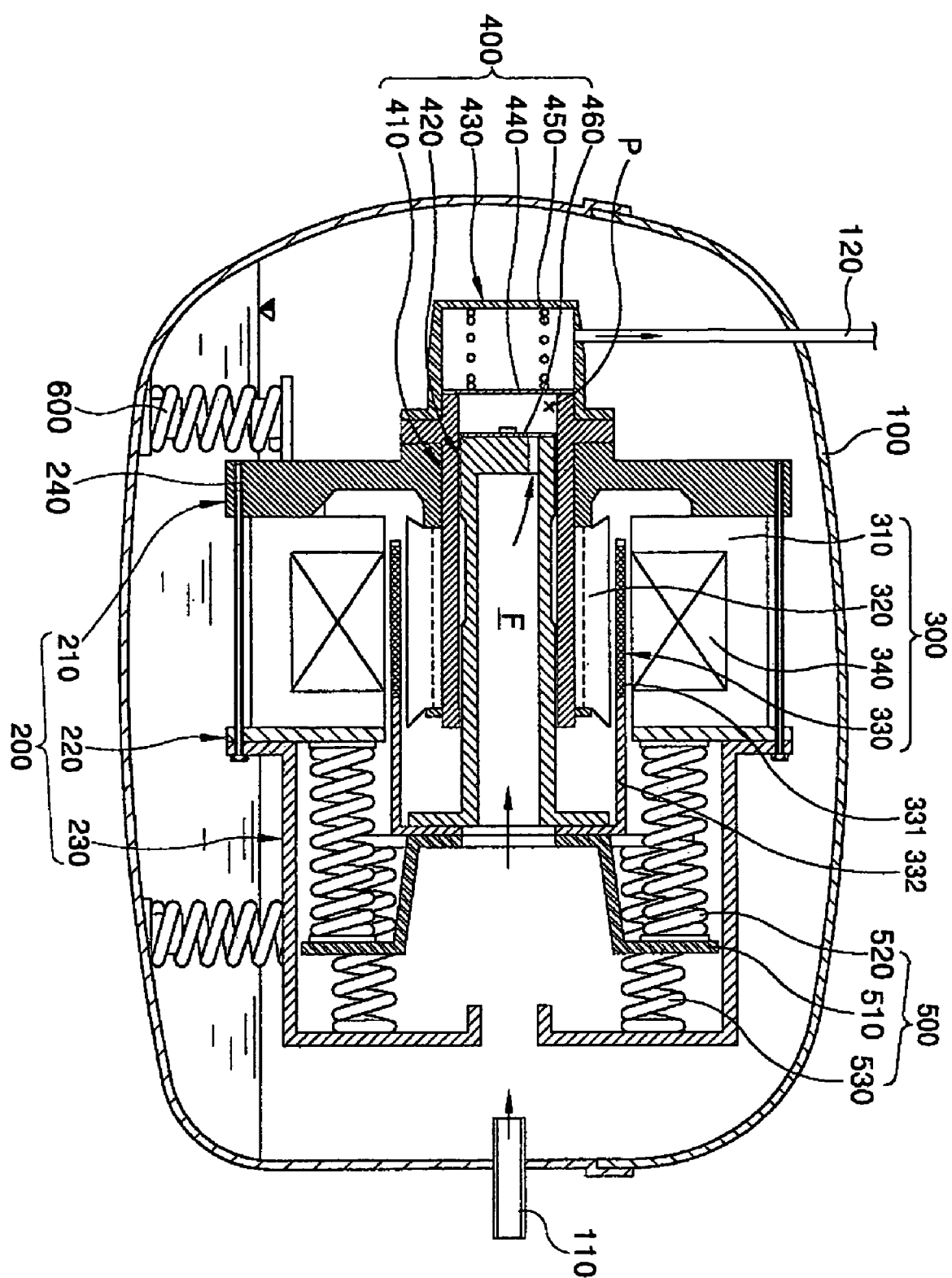
[Fig. 1]

[Fig. 2]
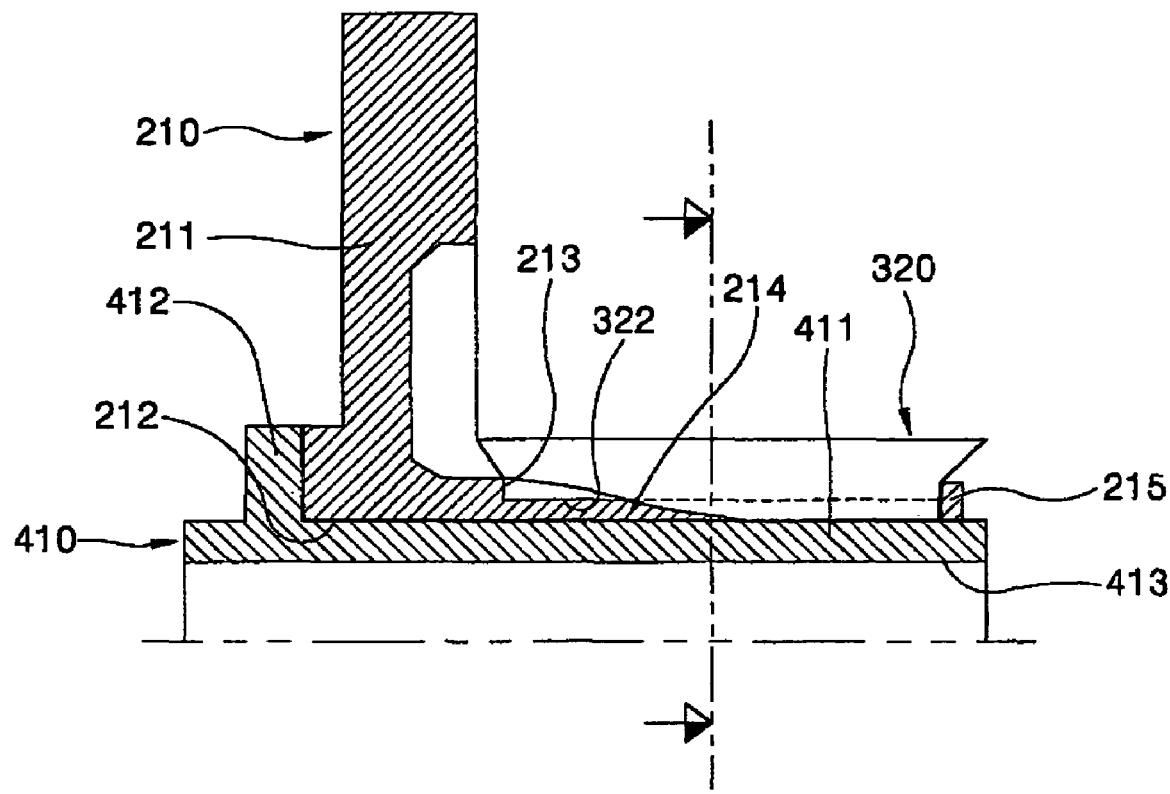
[Fig. 3]
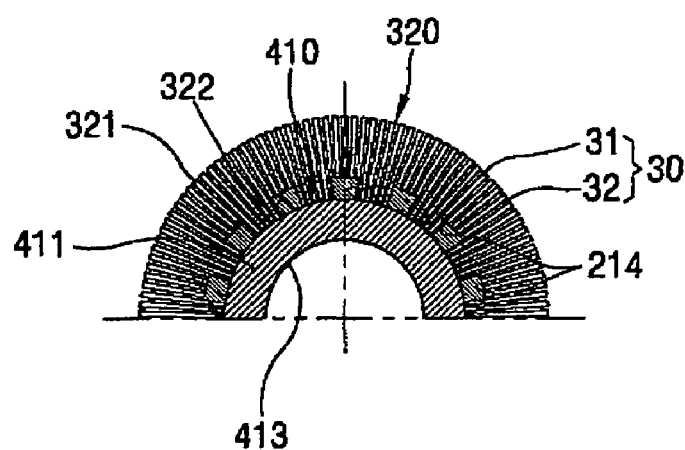

[Fig. 4]
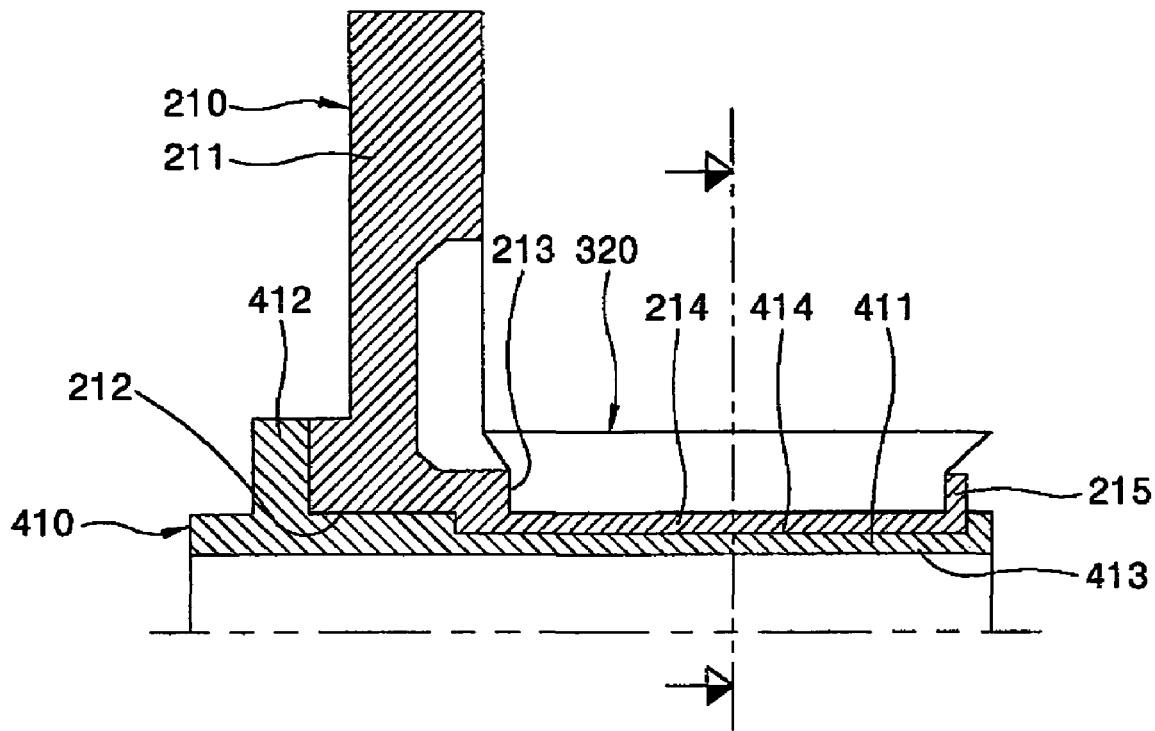
[Fig. 5]
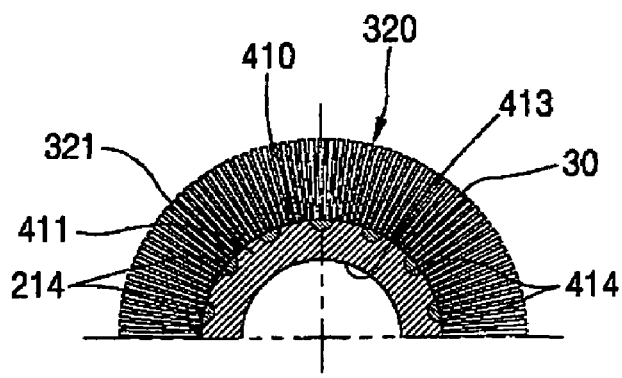

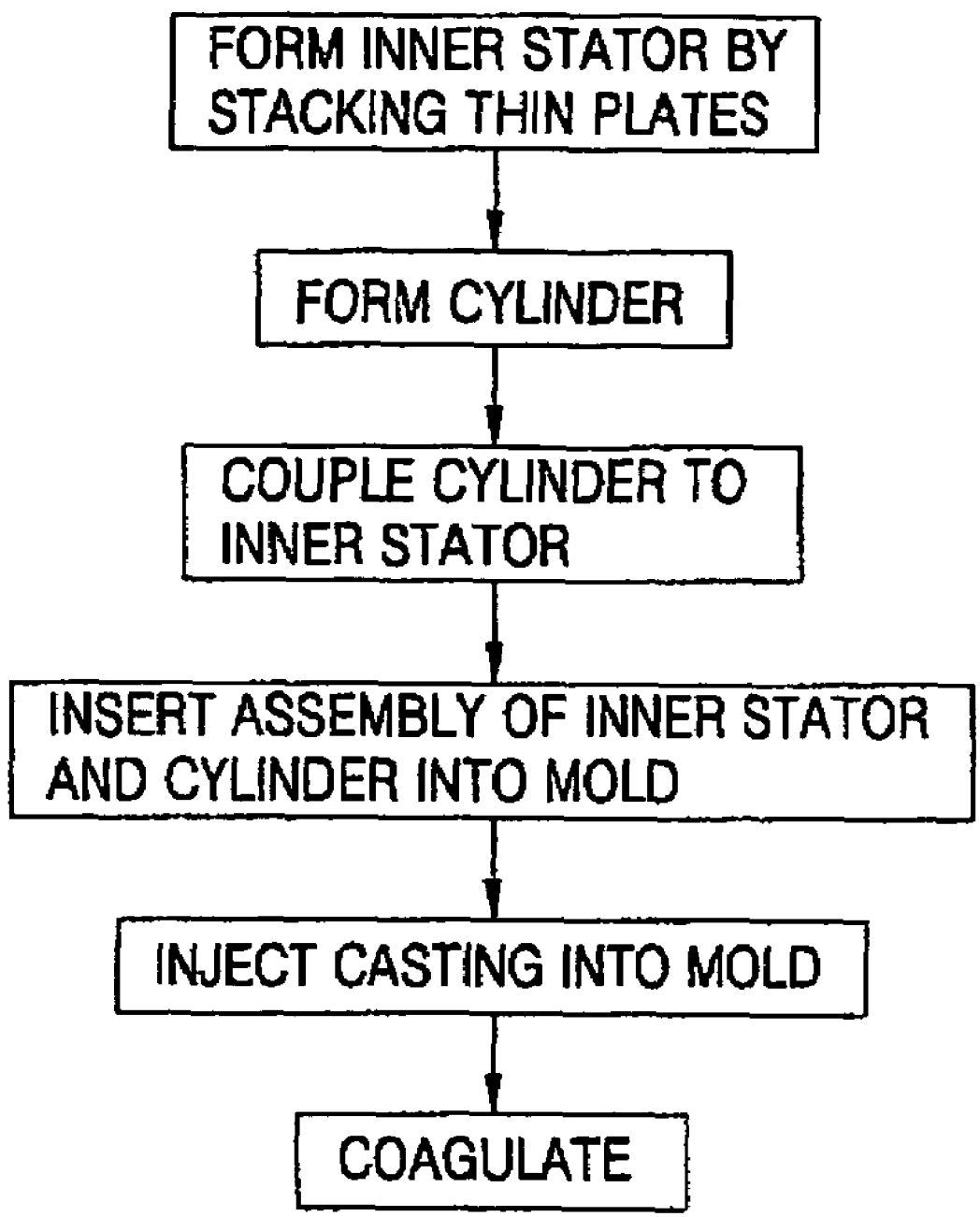
[Fig. 6]

[Fig. 7]
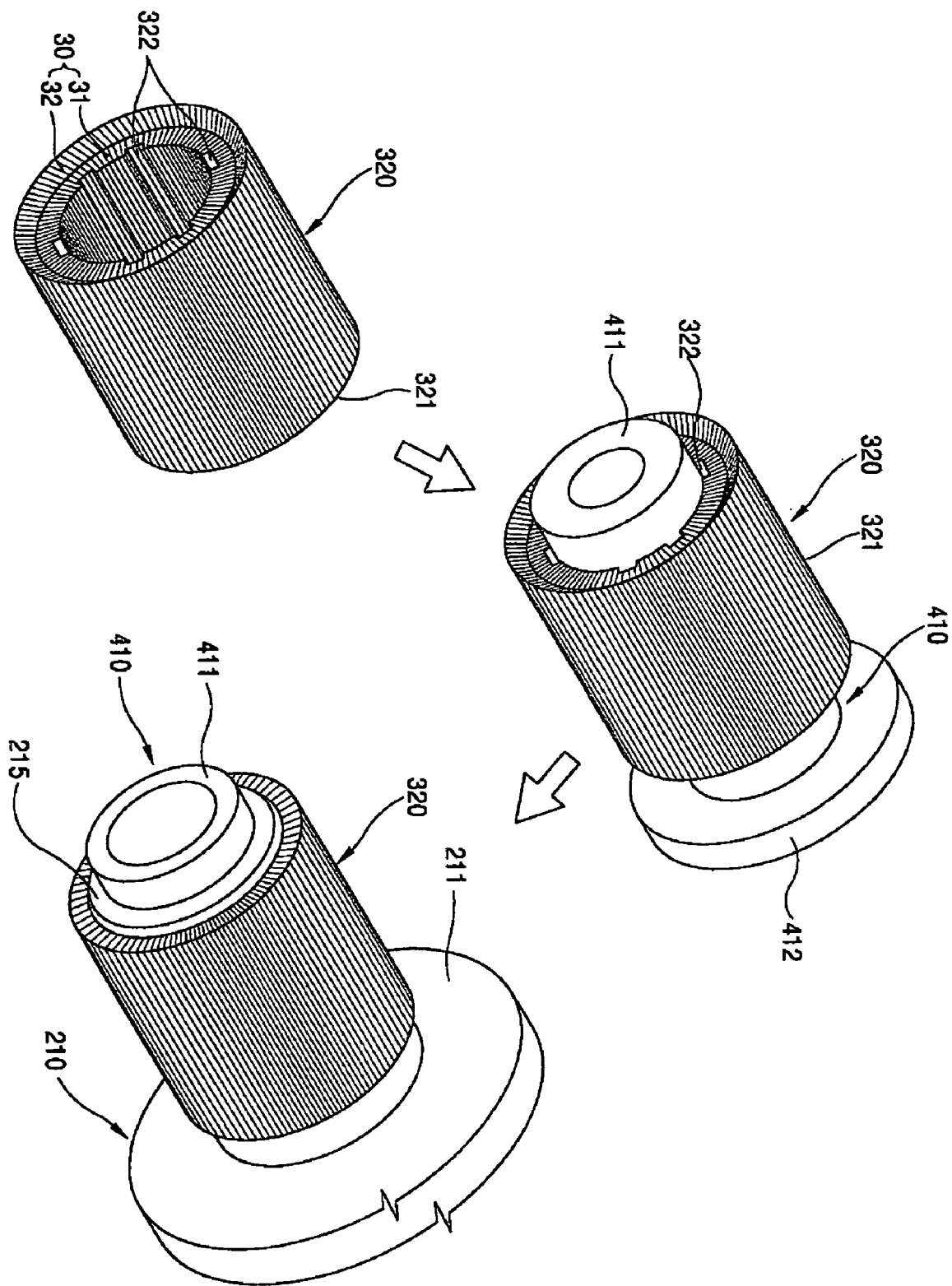

[Fig. 8]
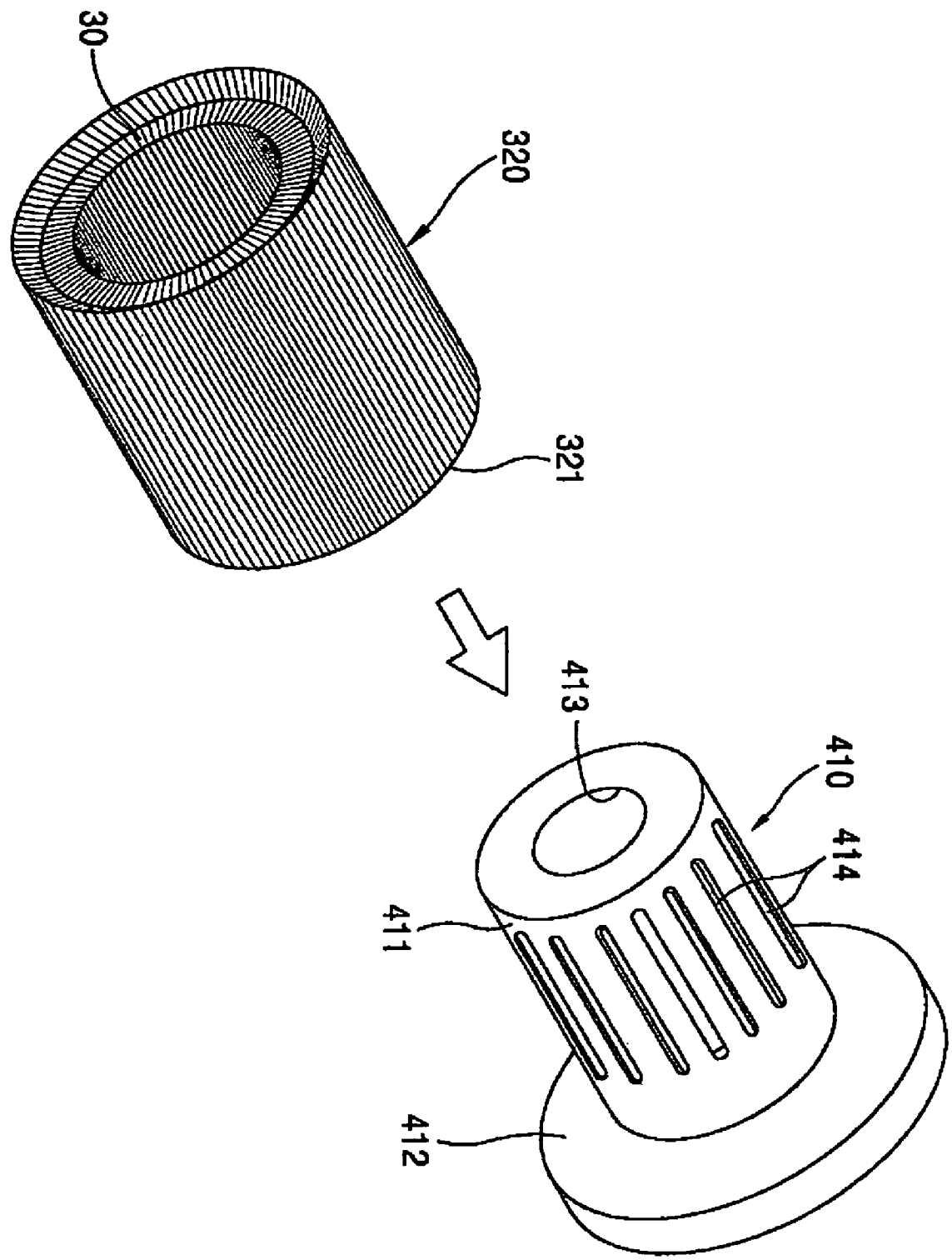

APPARATUS FOR FIXING A STATOR OF A MOTOR OF A RECIPROCAL COMPRESSOR

BACKGROUND OF THE INVENTION

1. Field of the Invention

The present invention relates to a reciprocal compressor, and more particularly to, an apparatus for fixing a stator of a motor of a reciprocal compressor which can fixedly couple the stator of the motor to other components, and a method therefor.

2. Description of Related Art

In general, a compressor transforms an electric energy into a kinetic energy, and compresses refrigerants by the kinetic energy. The compressor is one of the major components of a refrigeration cycle system, and classified into a rotary compressor, a scroll compressor and a reciprocal compressor awarding to a compression mechanism for compressing refrigerants.

The reciprocal compressor is classified into a compressor for compressing a gas by transforming a rotatory force of a rotary motor into linear reciprocation, and a compressor for compressing a gas by a linear reciprocation driving force of a linear motor.

The reciprocal compressor using the linear motor includes a frame, a linear motor for receiving power and generating a linear reciprocation driving force, a compression unit for receiving the linear reciprocation driving force of the linear motor and compressing a gas, a resonance unit for resonating a motion of the compression unit, and a valve unit for controlling flow of the gas.

The linear motor includes an outer stator, an inner stator inserted into the outer stator, and a mover movably inserted between the outer stator and the inner stator.

The outer stator and the inner stator are formed in a cylindrical shape. In order to minimize flux loss, a predetermined shape of thin plates are radially stacked in a cylindrical shape toward the center of the cylindrical shape. That is, the outer stator and the inner stator are stacked bodies.

The outer stator and the inner stator are fixedly coupled to the frame. Because the outer stator and the inner stator are the stacked bodies each respectively formed by radially stacking the plurality of thin plates in a cylindrical shape, it is very important to fixedly couple the plurality of thin plates composing the stacked bodies, and then fixedly couple the fixed stacked bodies to the frame or other object. Especially, an interval between the outer stator and the inner stator composing the linear motor influences efficiency of the linear motor. Accordingly, the outer stator and the inner stator must be precisely coupled to minimize the interval. In addition, when a flux flows through the outer stator and the inner stator, a force is applied to the thin plates composing the staked bodies. Thus, the thin plates must be firmly fixed. If the outer stator and the inner stator are not firmly fixed but separated in a thin plate coupling state, they may contact the mover, to damage components.

SUMMARY OF THE INVENTION

Therefore, an object of the present invention is to provide an apparatus for fixing a stator of a motor of a reciprocal compressor which can fixedly couple the stator of the motor to other components, and a method therefor.

To achieve these and other advantages and in accordance with the purpose of the present invention, as embodied and broadly described herein, there is provided an apparatus for fixing a stator of a motor of a reciprocal compressor, including: a predetermined shape of front frame; a cylinder inserted into and coupled to the front frame; an outer stator supported by the front frame in a contact state; an inner stator framed in a cylindrical shape and inserted onto the outside circumferential surface of the cylinder with a predetermined interval from an inside diameter of the outer stator; a mover inserted between the outer stator and the inner stator, and coupled to a piston inserted into the cylinder; and a stator fixing means incorporated with the front frame to pass through the cylinder or the inner stator in the longitudinal direction, for supporting and fixing both sides of the inner stator.

In addition, there is provided a method for fixing a stator of a motor of a reciprocal compressor, including the steps of: forming an inner stator by stacking a plurality of thin plates in a cylindrical shape; forming a cylindrical cylinder to be inserted into the inner stator; inserting the cylinder into the inner stator; inserting an assembly of the cylinder and the inner stator into a predetermined shape of mold; filling casting between the cylinder and the inner stator by injecting the casting into the mold; and coupling the cylinder to the inner stator by coagulating the casting injected between the cylinder and the inner stator.

The foregoing and other objects, features, aspects and advantages of the present invention will become more apparent from the following detailed description of the present invention when taken in conjunction with the accompanying drawings.

DESCRIPTION OF DRAWINGS

FIG. 1 is a cross-sectional diagram illustrating a reciprocal compressor including an apparatus for fixing a stator of a motor in accordance with a preferred embodiment of the present invention;

FIGS. 2 and 3 are front-sectional and side-sectional diagrams respectively illustrating the apparatus for fixing the stator of the motor of the reciprocal compressor in accordance with the preferred embodiment of the present invention;

FIGS. 4 and 5 are front-sectional and side-sectional diagrams respectively illustrating another example of a stator fixing means of the apparatus for fixing the stator of the motor of the reciprocal compressor in accordance with the preferred embodiment of the present invention;

FIG. 6 is a flowchart showing sequential steps of a method for fixing a stator of a motor of a reciprocal compressor in accordance with a preferred embodiment of the present invention;

FIG. 7 is an assembly process diagram illustrating the method for fixing the stator of the motor of the reciprocal compressor in accordance with the preferred embodiment of the present invention; and FIG. 8 is a perspective diagram illustrating another example of a casting passage unit in accordance with the preferred embodiment of the present invention.

DETAILED DESCRIPTION

Reference will now be made in detail to the preferred embodiments of the present invention, examples of which are illustrated in the accompanying drawings.

An apparatus for fixing a stator of a motor of a reciprocal compressor and a method therefor in accordance with the present invention will now be described in detail with reference to the accompanying drawings.

FIG. 1 is a cross-sectional diagram illustrating the reciprocal compressor including the apparatus for fixing the stator of the motor in accordance with the present invention.

Referring to FIG. 1, the reciprocal compressor includes a casing 100 having a suction tube 110 and a discharge tube 120, a frame unit 200 disposed in the casing 100, a motor 300 mounted on the frame unit 200, for generating a linear reciprocation driving force, a compression unit 400 for receiving the driving force of the motor 300 and compressing a gas, and a resonance spring unit 500 for resonating the driving force of the motor 300.

The frame unit 200 consists of a front frame 210 for supporting one side of the motor 300, the compression unit 400 being coupled internally to the front frame 210, an intermediate frame 220 for supporting the other side of the motor 300 with a predetermined interval from the front frame 210, and a rear frame 230 coupled to the intermediate frame 220, the resonance spring unit 500 being disposed therein.

The motor 300 includes an outer stator 310 fixed between the front frame 210 and the intermediate frame 230, an inner stator 320 inserted into the outer stator 310 with a predetermined interval, a mover 330 movably inserted between the outer stator 310 and the inner stator 320, and a wound coil 340 coupled internally to the outer stator 310. The mover 330 has a magnet 331 and a magnet holder 332 for supporting the magnet 331.

The compression unit 400 includes a cylinder 410 inserted and fixedly coupled between the front frame 210 and the inner stator 320, a piston 420 having its one side movably inserted into an inside spare P of the cylinder 410, and its other side fixedly coupled to the mover 330, and a valve system coupled to the piston 420 and the cylinder 410.

As illustrated in FIGS. 2 and 3, the front frame 210 has a base unit 211 formed with a predetermined thickness and area, and a cylinder insertion hole 212 formed at the center of the base unit 211 so that the cylinder 410 can be inserted thereinto.

The cylinder 410 consists of a cylindrical body unit 411 formed with a predetermined length and diameter, a through hole 413 into which the piston 420 is inserted being formed in the body unit 411, and a flange unit 412 protruded from one side of the body unit 411 with a predetermined width and height.

The body unit 411 is inserted into the cylinder insertion hole 212 of the front frame 210, and a fastening means (not shown) is fastened to the flange unit 412 and the base unit 211, thereby fixedly coupling the cylinder 410 to the front frame 210.

The inner stator 320 is formed in a cylindrical shape with a predetermined inside diameter, outside diameter and length. In a state where the cylinder 410 is fixedly coupled to the front frame 210, the body unit 411 of the cylinder 410 is inserted into the inner stator 320. The inner stator 320 is fixedly coupled by the stator fixing means, and the stator fixing means is formed to pass through the inner stator 320 in the longitudinal direction, for supporting and fixing both sides of the inner stator 320.

The inner stator 320 is a stacked body 321 formed by stacking a predetermined shape of thin plates 30. The thin plates 30 composing the cylindrical stacked body 321 are stacked toward the center direction of the cylindrical stacked body 321. The thin plates 30 can be fixed by using a special fixing ring (not shown).

Still referring to FIGS. 2 and 3, the stator fixing means includes a first supporting unit 213 formed at one side of the front frame 210 with a predetermined area, for contacting and supporting one side of the inner stator 320, a plurality of passage grooves 322 formed in the longitudinal direction on the inside circumferential surface of the inner stator 320 contacting the outside circumferential surface of the cylinder 410, a plurality of filling bar units 214 extended from the first supporting unit 213, and inserted into the passage grooves 322 of the inner stator 320, respectively, and a second supporting unit 215 formed by connecting the filling bar units 214, for supporting the other side of the inner stator 320.

The first supporting unit 213 of the front frame 210 is formed as a ring-shaped surface on one surface of the base unit 211, namely the end surface of the cylinder insertion portion. Preferably, the first supporting unit 213 is vertical to the outside circumferential surface of the cylinder 410 inserted into the front frame 210.

The passage grooves 322 are formed on the inside circumferential surface of the inner stator 320 in the circumferential direction at predetermined intervals. The sections of the passage grooves 322 are formed in a rectangular shape. In addition, the sections of the filling bar units 214 filled in the passage grooves 322 are formed in a rectangular shape. However, it is notable that the sections of the passage grooves 322 can be formed in various shapes.

The passage grooves 322 of the inner stator 320 are formed by making a width of some of the thin plates 30 composing the inner stator 320 smaller than that of the other thin plates 30. That is, the plurality of thin plates 31 having a relatively large width are stacked, and the plurality of thin plates 32 having a relatively small width are stacked thereon. This procedure is repeated to form the cylindrical shape. When the thin plates 30 are stacked in a cylindrical shape, they are stacked so that the outside circumferential surface of the cylinder can have a uniform curved surface.

The second supporting unit 215 is formed in a ring shape with a predetermined thickness, and extended from the filling bar units 214. One side of the second supporting unit 215 contacts and supports one side of the inner stator 320. Preferably, the second supporting unit 215 is vertical to the circumferential surface of the cylinder 410.

The front frame 210, the filling bar units 214 and the second supporting unit 215 are formed by using the same material.

FIGS. 4 and 5 are front-sectional and side-sectional diagrams respectively illustrating another example of the stator fixing means in accordance with the present invention. As shown in FIGS. 4 and 5, the stator fixing means includes a first supporting unit 213 armed at one side of the front frame 210 with a predetermined area, for contacting and supporting one side of the inner stator 320, a plurality of passage grooves 414 formed in the longitudinal direction on the outside circumferential surface of the cylinder 410 contacting the inside circumferential surface of the inner stator 320, a plurality of filling bar units 214 extended from the first supporting unit 213, and inserted into the passage grooves 414 of the cylinder 410, respectively, and a second supporting unit 215 armed by connecting the filling bar units 214, for supporting the other side of the inner stator 320.

The first supporting unit 213 of the front frame 210 is formed as a ring-shaped surface on one surface of the base unit 211, namely the end surface of the cylinder insertion portion. Preferably, the first supporting unit 213 is vertical to the outside circumferential surface of the cylinder 410 inserted into the front frame 210.

The passage grooves 414 are formed on the outside circumferential surface of the cylinder 410 in the circumferential direction at predetermined intervals. The sections of the passage grooves 414 are formed in a semicircular shape. In addition, the sections of the filling bar units 214 filled in the passage grooves 414 are formed in a semicircular shape. However, it is notable that the sections of the passage grooves 414 can be formed in various shapes.

The second supporting unit 215 is formed in a ring shape with a predetermined thickness, and extended from the filling bar units 214. One side of the second supporting unit 215 contacts and supports one side of the inner stator 320. Preferably, the second supporting unit 215 is vertical to the circumferential surface of the cylinder 410.

The front frame 210, the filling bar units 214 and the second supporting unit 215 are formed by using the same material.

Same drawing reference numerals are used for the same elements in FIGS. 2 and 3 and FIGS. 4 and 5.

On the other hand, as illustrated in FIG. 1, the valve system includes a discharge cover 430 mounted on one side of the front frame 210, for covering/uncovering the inside space P of the cylinder 410, a discharge valve 440 mounted inside the discharge cover 430, for opening/closing the inside space P of the cylinder 410, a discharge spring 450 disposed in the discharge cover 430, for supporting the discharge valve 440, and a suction valve 460 mounted on the end of the piston 420, for controlling flow of refrigerants sucked into the inside space P of the cylinder 410.

Reference numeral 240 denotes a fastening bolt, 510 denotes a spring support member, 520 denotes a front coil spring, 530 denotes a rear coil spring, and 600 denotes a support spring.

FIGS. 6 and 7 are a flowchart and a process diagram showing sequential steps of a method for fixing a stator of a motor of a reciprocal compressor in accordance with a preferred embodiment of the present invention.

Referring to FIGS. 6 and 7, the method for fixing the stator of the motor of the reciprocal compressor includes the steps of forming a cylindrical inner stator 320, and forming a cylindrical cylinder 410 to be inserted into the inner stator 320. The inner stator 320 is formed by stacking a predetermined shape of thin plates 30 in a cylindrical shape. Here, the plurality of thin plates 30 are stacked so that passage grooves 322 through which casting flows can be formed in the longitudinal direction on the inside circumferential surface of the inner stator 320. The passage grooves 322 are disposed in the circumferential direction at predetermined intervals on the inside circumferential surface of the inner stator 320 that is a cylindrical stacked body. The passage grooves 322 are formed by alternately stacking the stacked bodies including a relatively large size of thin plates 31 and the stacked bodies including a relatively small size of thin plates 32.

The cylinder 410 and the inner stator 320 are formed in different production lines.

In addition, the method for fixing the stator of the motor of the reciprocal compressor includes the steps of inserting the cylinder 410 into the inner stator 320, inserting an assembly of the cylinder 410 and the inner stator 320 into a predetermined shape of mold (not shown), filling casting between the cylinder 410 and the inner stator 320 by injecting the casting into the mold, and coupling the cylinder 410 to the inner stator 320 by coagulating the casting injected between the cylinder 410 and the inner stator 320.

The casting injected into the mold is coagulated to couple the cylinder 410 to the inner stator 320, and to form a predetermined shape of front frame 210 into which the cylinder 410 is inserted.

When the casting is injected into the mold, some of the casting flows from one to the other side of the inner stator 320 through the passage grooves 322, and is also filled in the passage grooves 322.

Preferably, the mold is a diecasting mold, and the casting is fused aluminum.

FIG. 8 is a perspective diagram illustrating another example of the casting passage unit in accordance with the present invention. As illustrated in FIG. 8, in the step for forming the cylinder 410, a plurality of passage grooves 414 are formed on the outside circumferential surface of the cylinder 410 with a predetermined width, depth and longitudinal direction length, so that the casting can flow in the longitudinal direction of the inner stator 320 when injected into the assembly of the cylinder 410 and the inner stator 320. Preferably, the plurality of passage grooves 414 can be formed in the circumferential direction of the cylinder 410 at predetermined intervals.

The operational effects of the apparatus for fixing the stator of the motor of the reciprocal compressor and the method therefor will now be described in detail.

First, the operation of the reciprocal compressor will now be explained.

When power is supplied to the reciprocal compressor, the linear reciprocation driving force is generated by the electromagnetic interaction of the motor 300, and transmitted to the piston 420 through the mover 330.

The piston 420 linearly reciprocates in the inside space P of the cylinder 410. The suction valve 460 and the discharge valve 440 are operated due to a pressure difference generated in the inside space P of the cylinder 410, for sucking refrigerants into the inside space P of the cylinder 410, and compressing and discharging the refrigerants.

The resonance spring unit 500 resonates the reciprocation of the mover 330 and the piston 420.

A force is applied to the thin plates 30 composing the inner stator 320 by a flux formed by the outer stator 310 and the inner stator 320 of the motor 300 during the operation of the compressor. However, in a state where the cylinder 410 is inserted into the inner stator 320, the inner stator 320 is firmly fixed by the stator fixing means formed to pass through the cylinder 410 or the inner stator 320 in the longitudinal direction, for supporting and fixing both sides of the inner stator 320. Accordingly, the thin plates 30 composing the inner stator 320 do not move. That is, the inner stator 320 is firmly fixed by the first and second supporting units 213 and 215 disposed at both sides of the inner stator 320, and the filling bar units 214 for coupling the first and second supporting units 213 and 215.

In addition, the inner stator 320 is fixed in a state where the cylinder 410 is inserted thereinto, thereby reducing a circumferential direction size of the assembly of the front frame 210, the cylinder 410 and the inner stator 320.

On the other hand, in accordance with the method for fixing the stator of the motor of the reciprocal compressor, the casting is filled and coagulated between the cylinder 410 and the inner stator 320 to fix the inner stator 320, and part of the casting passes through the inner stator 320 and is coagulated on the front frame 210 and at both sides of the inner stator 320, to firmly fix the inner stator 320. Because the casting fixes the inner stator 320, the process for fixing the inner stator 320 is simplified. In addition, the front frame 210 and the stator fixing means are incorporated by the casting, to reduce a number of components.

INDUSTRIAL APPLICABILITY

As discussed earlier, in accordance with the present invention, the apparatus for fixing the stator of the motor of the reciprocal compressor and the method therefor improve reliability and prevent the components from being separated and damaged, by precisely maintaining the assembly tolerance between the components during the operation of the reciprocal compressor, by firmly fixing the inner stator of the motor.

Moreover, the apparatus for fixing the stator of the motor of the reciprocal compressor and the method therefor improve assembly productivity by simplifying the process for fixing the inner stator of the motor and reducing the number of the components.

Furthermore, the apparatus for fixing the stator of the motor of the reciprocal compressor and the method therefor reduce the whole size of the reciprocal compressor, by decreasing the radial direction size of the assembly of the front frame, the cylinder and the inner stator.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for fixing a stator of a motor of a reciprocal compressor, the apparatus comprising:
    a front frame;
    a cylinder inserted into and coupled to the front frame;
    an outer stator supported by and contacting the front frame;
    an inner stator formed in a cylindrical shape and inserted onto an outside circumferential surface of the cylinder with a predetermined interval from an inside diameter of the outer stator;
    a mover inserted between the outer stator and the inner stator, and coupled to a piston inserted into the cylinder; and
    a stator fixing device incorporated with the front frame and passing through the cylinder or the inner stator in a longitudinal direction, that supports and fixes both sides of the inner stator, wherein the stator fixing device comprises:
        a first support formed at one side of the front frame with a predetermined area that contacts and supports one side of the inner stator;
        a plurality of passage grooves formed in the longitudinal direction on an inside circumferential surface of the inner stator contacting the outside circumferential surface of the cylinder;
        a plurality of filling bars that extends from the first support that are inserted into the passage grooves of the inner stator, respectively; and
        a second support formed by connecting the filling bars that supports other side of the inner stator.

2. The apparatus of claim 1, wherein the cylindrical inner stator is a stacked body formed by stacking a plurality of thin plates of a predetermined shape.

3. The apparatus of claim 1, wherein the plurality of passage grooves are formed on the inside circumferential surface of the inner stator in the circumferential direction at predetermined intervals.

4. The apparatus of claim 1, wherein sections of the plurality of filling bars and sections of the plurality of passage grooves are formed in a rectangular shape.

5. The apparatus of claim 1, wherein the first support extends perpendicular to the outside circumferential surface of the cylinder.

6. The apparatus of claim 1, wherein the second support is formed in a ring shape with a predetermined thickness, and extends from the plurality of filling bars.

7. An apparatus for fixing a stator of a motor of a reciprocal compressor, the apparatus comprising:
    a front frame;
    a cylinder inserted into and coupled to the front frame;
    an outer stator supported by and contacting the front frame;
    an inner stator formed in a cylindrical shape and inserted onto an outside circumferential surface of the cylinder with a predetermined interval from an inside diameter of the outer stator;
    a mover inserted between the outer stator and the inner stator, and coupled to a piston inserted into the cylinder; and
    a stator fixing device incorporated with the front frame and passing through the cylinder or the inner stator in a longitudinal direction, that supports and fixes both sides of the inner stator, wherein the stator fixing device comprises:
        a first support formed at one side of the front frame with a predetermined area that contacts and supports one side of the inner stator;
        a plurality of passage grooves formed in the longitudinal direction on an outside circumferential surface of the cylinder contacting an inside circumferential surface of the inner stator;
        a plurality of filling bars that extends from the first support that are inserted into the plurality of passage grooves, respectively; and
        a second support formed by connecting the plurality of filling bars that support the other side of the inner stator.

8. The apparatus of claim 7, wherein the plurality of passage grooves are formed on the outside circumferential surface of the cylinder in the circumferential direction at predetermined intervals.

9. The apparatus of claim 7, wherein sections of the plurality of filling bars and the plurality of passage grooves are formed in a semicircular shape.

10. The apparatus of claim 7, wherein the first support extends perpendicular to the outside circumferential surface of the cylinder.

11. The apparatus of claim 7, wherein the second support is formed in a ring shape with a predetermined thickness and extends from the plurality of filling bars.

12. The apparatus of claim 7, wherein the cylindrical inner stator is a stacked body formed by stacking a predetermined shape of thin plates, and wherein the thin plates comprising the cylindrical stacked body are stacked toward a center direction of the cylindrical stacked body.

* * * * *